(No Model.)
W. S. FURNAS & T. KENDERDINE.
APPARATUS FOR KILLING POULTRY.
No. 487,560. Patented Dec. 6, 1892.
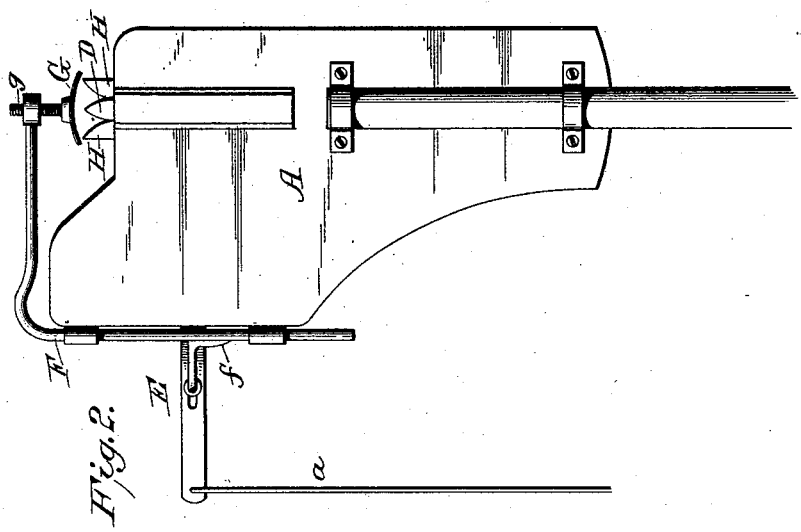
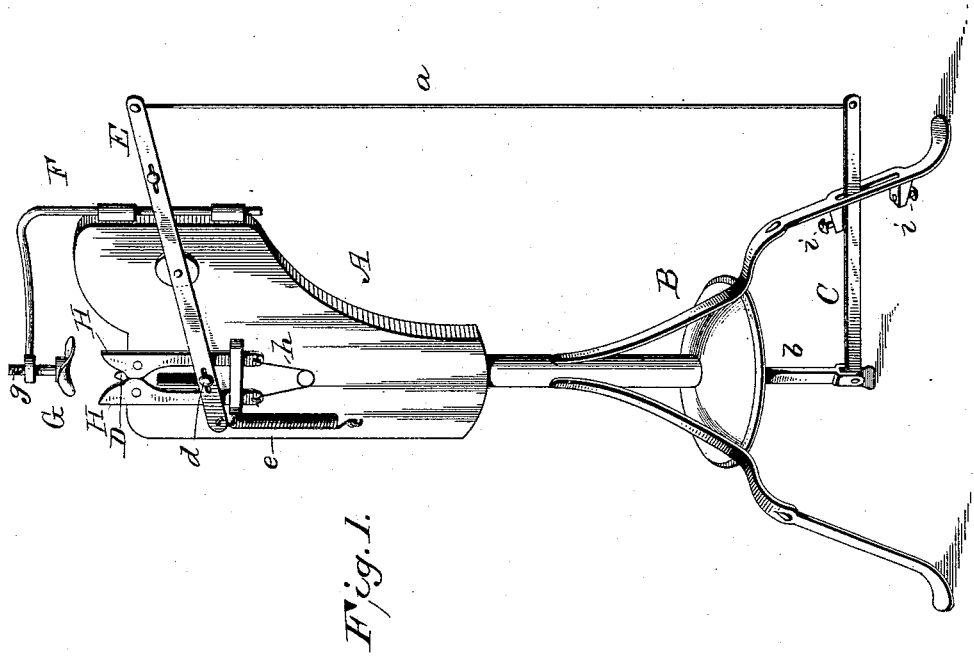
Witnesses
E. W. Johnson
H. L. Beall
Theodore Kenderdine,
Walter S. Furnas.
Inventors
by 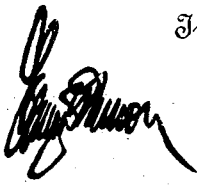
Attorney

United States Patent Office.

WALTER S. FURNAS AND THEODORE KENDERDINE, OF LISBON, IOWA; SAID KENDERDINE ASSIGNOR TO SAID FURNAS.

APPARATUS FOR KILLING POULTRY.

SPECIFICATION forming part of Letters Patent No. 487,560, dated December 6, 1892.

Application filed July 30, 1892. Serial No. 441,661. (No model.)

*To all whom it may concern:*

Be it known that we, WALTER S. FURNAS and THEODORE KENDERDINE, citizens of the United States of America, residing at Lisbon, in the county of Linn and State of Iowa, have invented certain new and useful Improvements in Apparatus for Killing Poultry; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an apparatus for killing poultry.

The object of the invention is to provide a cheap, simple, and effective apparatus for killing and properly bleeding poultry; and it consists in the combination, with a suitable frame, of a vertical knife, retaining-jaws, and an adjustable holder, the knife and holder being connected to a lever to operate in unison, as will be hereinafter fully set forth, and particularly pointed out in the claims.

In the accompanying drawings, forming a part of this specification, Figure 1 is a perspective view of a poultry-killing apparatus constructed in accordance with our invention. Fig. 2 is a rear elevation of a portion of the device.

A designates a suitable frame, which is mounted upon a base B, said base having a depending portion $b$, to which a bar or foot-lever C is pivoted, the movement of the foot-lever being limited vertically by stops carried by one of the supporting-legs. The frame carries a vertically-movable knife or lance D, which is provided with an outwardly-projecting pin or equivalent means for connecting the same with a lever E, said lever being pivoted to the frame, as shown. This lever is slotted to receive the pin $d$, and at its end beyond said slot is attached to a spring $e$, the tendency of which is to draw the knife down. One side of the frame carries a movable bar or frame F, one end of which projects above the knife or lance and is provided with an adjustable block or holder G, the function of which is to bear upon the head or neck of the fowl when the lever E is depressed, the frame carrying said holder being pivoted to the opposite end of the lever from the knife, so that when said knife moves up the holder will move down. The block or holder G is connected to the frame F by a stem or rod $g$, which is screw-threaded and passes through a screw-threaded aperture in said frame, so that by simply turning the block it can be adjusted to properly bear upon the heads of fowls of different sizes. The bar or frame F is connected to the lever E by a short arm $f$, the outer end of said lever being connected by a rod $a$ to the foot-lever C.

H H designate the jaws, which are carried by the frame on the opposite side from the knife or lance, these jaws being pivoted to the frame and their lower ends connected by a spring $h$, the tendency of which is to spread the lower ends so as to move the upper ends toward each other.

From the construction described it will be noted that the fowl to be killed will be held by the operator, the neck being placed between the jaws H, and that by simply pressing down upon the foot-lever C the block or holder carried by the bar or frame F is moved down while the lance or knife is moved up to sever the medulla oblongata and main arteries and enter the brain.

If desired, the jaws H H can be rigidly attached to the frame instead of being pivotally secured thereto; also, the foot-lever C may pass through a suitable guide, and said guide may be slotted and provided with set-screws $i\ i$ to limit the up or down movement of the lever, so that the adjustments can be made for different-size poultry to move the knife or lance to the desired extent.

Having thus described our invention, we claim—

1. In a device for killing poultry, the combination of a suitable supporting-frame carrying a lever, a vertically-movable knife or lance and holder connected to said lever on opposite sides of its fulcrum, a fork having the members thereof pivoted to the frame, and a spring connected to the members of said fork, and means connected to the lever and frame for normally holding the end which carries the lance or knife depressed, substantially as shown, and for the purpose set forth.

2. In a device for killing poultry, the combination of a frame A, having guides for a vertically-movable knife or lance, and a frame carrying an adjustable holder, means carried by the knife or lance and bar which carries the adjustable holder, which engages with slotted portions of a lever E, said lever being fulcrumed near its center to the frame A, a fork carried by the frame to one side of the path of the knife or lance, and a bar for connecting the outer end of the lever to a pivoted bar or treadle for depressing the same, substantially as shown, and for the purpose set forth.

3. In a device for killing poultry, the combination of a suitable supporting-frame carrying a lever which is connected on opposite sides of its fulcrum to a movable knife or lance, and a holder, said lever being connected by a rod to a lever C, which is pivoted to the supporting-frame, said lever C passing through a guide, and set-screws adapted to engage with the lever C for limiting the movement of the lever E, substantially as shown, and for the purpose set forth.

4. In a device for killing poultry, the combination of a movable or reciprocating knife or lance, a holder adjustably mounted on a support, said support being adapted to be moved in an opposite direction with the knife and in unison therewith, and a forked holder the members of which are pivotally attached to the frame to one side of the lance, substantially as set forth.

5. In a device for killing poultry, the combination, with a movable knife and a movable holder, of a retaining-fork made up of two members pivoted to the main frame, the lower ends of said members being connected by a spring, the fork being located to one side of the knife and holder, substantially as shown, and for the purpose set forth.

In testimony whereof we affix our signatures in presence of two witnesses.

WALTER S. FURNAS.
THEODORE KENDERDINE.

Witnesses:
M. D. MORTON,
D. E. LONG.